US012755515B2

(12) United States Patent
Simón

(10) Patent No.: US 12,755,515 B2
(45) Date of Patent: Oct. 6, 2026

(54) METHOD OF OBTAINING AN ATTENTION MATRIX FOR USE IN A TRANSFORMER-BASED MODEL, NON-TRANSITORY COMPUTER READABLE STORAGE MEDIUM AND APPARATUS

(71) Applicant: MILESTONE SYSTEMS A/S, Brøndby (DK)

(72) Inventor: Marc Oliu Simón, Brøndby (DK)

(73) Assignee: MILESTONE SYSTEMS A/S, Brøndby (DK)

( * ) Notice: Subject to any disclaimer, the term of this patent is extended or adjusted under 35 U.S.C. 154(b) by 248 days.

(21) Appl. No.: 18/597,284

(22) Filed: Mar. 6, 2024

(65) Prior Publication Data

US 2024/0378861 A1 Nov. 14, 2024

(30) Foreign Application Priority Data

Mar. 8, 2023 (GB) ...................................... 2303369

(51) Int. Cl.

*G06V 10/77* (2022.01)
*G06V 10/764* (2022.01)
*G06V 10/766* (2022.01)
*G06V 10/94* (2022.01)

(52) U.S. Cl.

CPC .......... *G06V 10/7715* (2022.01); *G06V 10/94* (2022.01); *G06V 10/764* (2022.01); *G06V 10/766* (2022.01)

(58) Field of Classification Search

CPC ............... G06V 10/7715; G06V 10/94; G06V 10/764; G06V 10/766; G06V 10/82; G06V 10/40; G06V 10/70; G06T 9/40; G06T 9/002; G06T 9/008; G06T 2207/20081; G06T 2207/20084; G06N 3/02; G06N 20/00

See application file for complete search history.

(56) References Cited

U.S. PATENT DOCUMENTS

2014/0376634 A1* 12/2014 Guo ..................... H04N 19/523 375/240.16
2022/0374676 A1* 11/2022 Chen ....................... G06F 17/16
2024/0282014 A1* 8/2024 Mityagin .................. G06T 9/40

(Continued)

FOREIGN PATENT DOCUMENTS

KR 10-2008-0021181 A 3/2008

OTHER PUBLICATIONS

J. Masci, et al., Multi-scale pyramidal pooling network for generic steel defect classification, The 2013 International Joint Conference on Neural Networks (IJCNN), Dallas, TX, USA, 2013.

(Continued)

*Primary Examiner* — Iriana Cruz

(74) *Attorney, Agent, or Firm* — Canon.U.S.A., Inc. IP Division

(57) ABSTRACT

A method of obtaining an attention matrix for use in a transformer-based model, a non-transitory computer readable storage medium, and an apparatus are provided. The method includes applying an attentional mechanism over a quadtree representation of an input image. The method may be used for image classification, for example in the field of video surveillance.

18 Claims, 6 Drawing Sheets

(56) References Cited

U.S. PATENT DOCUMENTS

2024/0397057 A1* 11/2024 Kang .................. G06N 3/0464

OTHER PUBLICATIONS

Ali Reza Yamghani, et al., Compressed Domain Video Abstraction Based on I-Frame of HEVC Coded Videos, Circuits, Systems, and Signal Processing, vol. 38, Aug. 2018.
Alec Radford, et al., Improving Language Understanding by Generative Pre-Training, Computer Science, Linguistics, 2018.

* cited by examiner

METHOD OF OBTAINING AN ATTENTION MATRIX FOR USE IN A TRANSFORMER-BASED MODEL, NON-TRANSITORY COMPUTER READABLE STORAGE MEDIUM AND APPARATUS

CROSS-REFERENCE TO RELATED APPLICATION

This application claims the benefit under 35 U.S.C. § 119(a)-(d) of United Kingdom Patent Application No. 2303369.9, filed on Mar. 8, 2023 and titled "IMAGE CLASSIFICATION METHOD, AND COMPUTER-READABLE STORAGE MEDIUM". The above cited patent application is incorporated herein by reference in its entirety.

TECHNICAL FIELD

The present application is directed to the application of an attention mechanism in computer vision. In particular, the present application relates to an image classification method for a computer device. For example, the method provides an attention mechanism applied over a quadtree representation of an input image. The method may for example be used in the field of video surveillance, where there is a need to classify images.

BACKGROUND

Methods for diverting attention to the most important regions of an image and disregarding irrelevant parts are called attention mechanisms. In a vision system, an attention mechanism can be treated as a dynamic selection process that is realised by adaptively weighting features according to the importance of the input.

In computer vision, attention is either used in conjunction with convolutional neural networks (CNN) or used to substitute certain aspects of convolutional neural networks while keeping their entire composition intact. However, this dependency on CNN is not mandatory, and a pure transformer applied directly to sequences of image patches can work exceptionally well on image classification tasks. One such example is the Vision Transformer (ViT) model.

A transformer in machine learning is a deep learning model that uses the mechanisms of attention, differentially weighting the significance of each part of the input data. Transformers in machine learning are composed of multiple self-attention layers.

The ViT model represents an input image as a series of image patches, and directly predicts class labels for the image. CNN uses pixel arrays, whereas ViT splits the images into visual tokens. The visual transformer divides an image into fixed-size patches, correctly embeds each of them, and includes positional embedding as an input to the transformer encoder.

The self-attention layer in ViT makes it possible to embed information globally across the overall image. The model also learns on training data to encode the relative location of the image patches to reconstruct the structure of the image.

Vision transformers have extensive applications in popular image recognition tasks such as object detection, segmentation, image classification, and action recognition.

Technical Problem

In recent years, Transformer models have revolutionized machine learning in general. While this has resulted in impressive results in the field of Natural Language Processing, Computer Vision quickly stumbled upon computation and memory problems due to the high resolution and dimensionality of the input data. This is particularly true for video, where the number of tokens increases cubically relative to the frame and temporal resolutions. A first approach to solve this were Vision Transformers, which introduce a partitioning of the input into embedded grid cells, lowering the effective resolution. More recently, Swin Transformers introduced a hierarchical scheme that brought the concepts of pooling and locality to transformers in exchange for much lower computational and memory costs.

However, Swin Transformers only consider long range dependencies in an indirect fashion. It is only thanks to its window shifting mechanism that, through the use of multiple Swin Transformer blocks, information can slowly diffuse to distant regions of the image.

SUMMARY OF THE DISCLOSURE

This work proposes a reformulation of Swin Transformers that views Swin Transformers as regular Transformers applied over a quadtree representation of the input, a reformulation that intrinsically provides a wider range of design choices for the attentional mechanism.

Compared to similar approaches such as Swin and MaxViT, our method works on the full range of scales while using a single attentional mechanism, allowing us to simultaneously take into account both dense short range and sparse long-range dependencies with low computational overhead and without introducing additional sequential operations, thus making full use of GPU parallelism.

According to an aspect of the present disclosure, there is provided a method of obtaining an attention matrix for use in a transformer-based model, the method comprising:

inputting a d-dimensional piece of data, where d represents the number of dimensions of the data, $D_i$ represents the length of the i-th dimension for $i \in [1, \ldots, d]$ and $D_1 \times \ldots \times D_d$ corresponds to the size of the input data, factorizing each of the lengths of the input into the form $$D_i = \prod_{j=1}^{k} p_j^{n_j},$$

wherein $p_j$ is the j-th prime factor and $n_j$ is the number of repetitions of said factor, representing the input X of size $$\left(\prod_{i=1}^{k} p_j\right) \times \ldots \times \left(\prod_{i=1}^{k} p_j\right)$$

as:

$$X = \mathbb{R}^{((D_1)_1 \times \ldots \times (D_1)_m) \times \ldots \times ((D_d)_1 \times \ldots \times (D_d)_m) \times F>}$$

where $|(D_i)_j| = p_k$ for $j \in [1, \ldots, m]$ and $|F|$ corresponds to the feature length of the feature vector of each spatial location, reshuffling the representation of the input to represent the input as:

$$X = \mathbb{R}^{((D_1)_1 \times \dots \times (D_d)_1) \times \dots \times ((D_1)_m \times \dots \times (D_d)_m) \times F>}$$

reshaping the representation of the input to form a first generation quadtree representation of the input as:

$$X = \mathbb{R}^{a_1 \times \dots \times a_m \times F>}$$

wherein $|a_i|=|(D_1)_i| \times \dots \times |(D_d)_i|$ for $i \in [1, \dots, m]$, wherein the spatial axes are the axes of the quadtree representation excluding the feature vector F, wherein the m spatial axes are ordered by granularity such that the rightmost axis represents the finest granularity level of the quadtree representation of the input, selecting a first set of k consecutive spatial axes of the quadtree representation to form a first attention window, wherein $1 \le k \le m$, computing an attention matrix over the first attention window, with the remaining spatial axes of the quadtree representation being a batch size.

The method according to the present disclosure may further comprise:

selecting any number of additional sets of k consecutive spatial axes on the quadtree representation to form additional attention windows different from the first attention window, applying an attentional mechanism at least once over the second attention window to form at least one second attention matrix, concatenating the first attention matrix with the at least one second attention matrix to form a concatenated attention matrix, normalising across rows of the concatenated attention matrix.

In the method according to the present disclosure, the attentional mechanism may be applied over all possible sets of k consecutive spatial axes, resulting in m−k+1 attention matrices.

The method according to the present disclosure may further comprise:

linearly projecting the rightmost spatial axis of the quadtree representation with the feature vector F to obtain a second generation feature vector F' for a second generation quadtree representation, wherein the second generation quadtree representation has one less spatial axis than the first generation quadtree representation.

In the method according to the present disclosure, the transformer-based model may be for either image classification or regression given a two-dimensional input representing an image.

In the method according to the present disclosure, the transformer-based model may be for either video classification or regression given a three-dimensional input representing a video.

According to another aspect of the present disclosure, there is provided a non-transitory computer readable storage medium storing a program for causing a computer to execute a method of obtaining an attention matrix for use in a transformer-based model, the method comprising:

inputting a d-dimensional piece of data, where d represents the number of dimensions of the data, $D_i$ represents the length of the i-th dimension for $i \in [1, \dots, d]$ and $D_1 \times \dots \times D_d$ corresponds to the size of the input data, factorizing each of the lengths of the input into the form $$D_i = \prod_{j=1}^{k} p_j^{n_j},$$

wherein $p_j$ is the j-th prime factor and $n_j$ is the number of repetitions of said factor, representing the input X of size $$\left(\prod_{i=1}^{k} p_j\right) \times \dots \times \left(\prod_{i=1}^{k} p_j\right)$$

as:

$$X = \mathbb{R}^{((D_1)_1 \times \dots \times (D_1)_m) \times \dots \times ((D_d)_1 \times \dots \times (D_d)_m) \times F>}$$

where $|(D_i)_j|=p_k$ for $j \in [1, \dots, m]$ and $|F|$ corresponds to the feature length of the feature vector of each spatial location, reshuffling the representation of the input to represent the input as:

$$X = \mathbb{R}^{((D_1)_1 \times \dots \times (D_d)_1) \times \dots \times ((D_1)_m \times \dots \times (D_d)_m) \times F>}$$

reshaping the representation of the input to form a first generation quadtree representation of the input as:

$$X = \mathbb{R}^{a_1 \times \dots \times a_m \times F>}$$

wherein $|a_i|=|(D_1)_i| \times \dots \times |(D_d)_i|$ for $i \in [1, \dots, m]$, wherein the spatial axes are the axes of the quadtree representation excluding the feature vector F, wherein the m spatial axes are ordered by granularity such that the rightmost axis represents the finest granularity level of the quadtree representation of the input, selecting a first set of k consecutive spatial axes of the quadtree representation to form a first attention window, wherein $1 \le k \le m$, computing an attention matrix over the first attention window, with the remaining spatial axes of the quadtree representation being a batch size.

In the non-transitory computer readable storage medium, the method may further comprise:

selecting any number of additional sets of k consecutive spatial axes on the quadtree representation to form additional attention windows different from the first attention window, applying an attentional mechanism at least once over the second attention window to form at least one second attention matrix, concatenating the first attention matrix with the at least one second attention matrix to form a concatenated attention matrix, normalising across rows of the concatenated attention matrix.

In the method in the non-transitory computer readable storage medium according to the present disclosure, the attentional mechanism may be applied over all possible sets of k consecutive spatial axes, resulting in m−k+1 attention matrices.

In the non-transitory computer readable storage medium according to the present disclosure, the method may further comprise:

linearly projecting the rightmost spatial axis of the quadtree representation with the feature vector F to obtain a second generation feature vector F' for a second generation quadtree representation, wherein the second generation quadtree representation has one less spatial axis than the first generation quadtree representation.

In the non-transitory computer readable storage medium according to the present disclosure, the transformer-based model may be for either image classification or regression given a two-dimensional input representing an image.

In the non-transitory computer readable storage medium according to the present disclosure, the transformer-based model may be for either video classification or regression given a three-dimensional input representing a video.

According to another aspect of the present disclosure, there is provided an apparatus for obtaining an attention matrix for use in a transformer-based model, the apparatus having at least one processor configured to:

input a d-dimensional piece of data, where d represents the number of dimensions of the data, $D_i$ represents the length of the i-th dimension for i∈[1, . . . , d] and $D_1 \times \ldots \times D_d$ corresponds to the size of the input data, factorize each of the lengths of the input into the form $$D_i = \prod_{j=1}^{k} p_j^{n_j}, 1$$

wherein $p_j$ is the j-th prime factor and $n_j$ is the number of repetitions of said factor, represent the input X of size $$\left(\prod_{i=1}^{k} p_j\right) \times \ldots \times \left(\prod_{i=1}^{k} p_j\right)$$

as:

$$X = \mathbb{R}^{((D_1)_1 \times \ldots \times (D_1)_m) \times \ldots \times ((D_d)_1 \times \ldots \times (D_d)_m) \times F>}$$

where $|(D_i)_j| = p_k$ for j∈[1, . . . , m] and |F| corresponds to the feature length of the feature vector of each spatial location, reshuffle the representation of the input to represent the input as:

$$X = \mathbb{R}^{((D_1)_1 \times \ldots \times (D_d)_1) \times \ldots \times ((D_1)_m \times \ldots \times (D_d)_m) \times F>}$$

reshape the representation of the input to form a first generation quadtree representation of the input as:

$$X = \mathbb{R}^{a_1 \times \ldots \times a_m \times F>}$$

wherein $|a_i| = |(D_1)_i| \times \ldots \times |(D_d)_i|$ for i∈[1, . . . , m], wherein the spatial axes are the axes of the quadtree representation excluding the feature vector F, wherein the m spatial axes are ordered by granularity such that the rightmost axis represents the finest granularity level of the quadtree representation of the input, select a first set of k consecutive spatial axes of the quadtree representation to form a first attention window, wherein 1≤k≤m, compute an attention matrix over the first attention window, with the remaining spatial axes of the quadtree representation being a batch size.

In the apparatus according to the present disclosure, the at least one processor may be configured to:

select any number of additional sets of k consecutive spatial axes on the quadtree representation to form additional attention windows different from the first attention window, apply an attentional mechanism at least once over the second attention window to form at least one second attention matrix, concatenate the first attention matrix with the at least one second attention matrix to form a concatenated attention matrix, normalise across rows of the concatenated attention matrix.

In the apparatus according to the present disclosure, the at least one processor may be configured to apply the attentional mechanism over all possible sets of k consecutive spatial axes, resulting in m−k+1 attention matrices.

In the apparatus according to the present disclosure, the at least one processor may be configured to:

linearly project the rightmost spatial axis of the quadtree representation with the feature vector F to obtain a second generation feature vector F' for a second generation quadtree representation, wherein the second generation quadtree representation has one less spatial axis than the first generation quadtree representation.

In the apparatus according to the present disclosure, the transformer-based model may be for either image classification or regression given a two-dimensional input representing an image.

In the apparatus according to the present disclosure, the transformer-based model may be for either video classification or regression given a three-dimensional input representing a video.

Additional features of the present disclosure will become apparent from the following description of embodiments with reference to the attached drawings.

DETAILED DESCRIPTION

Previous Work

Figure 1:
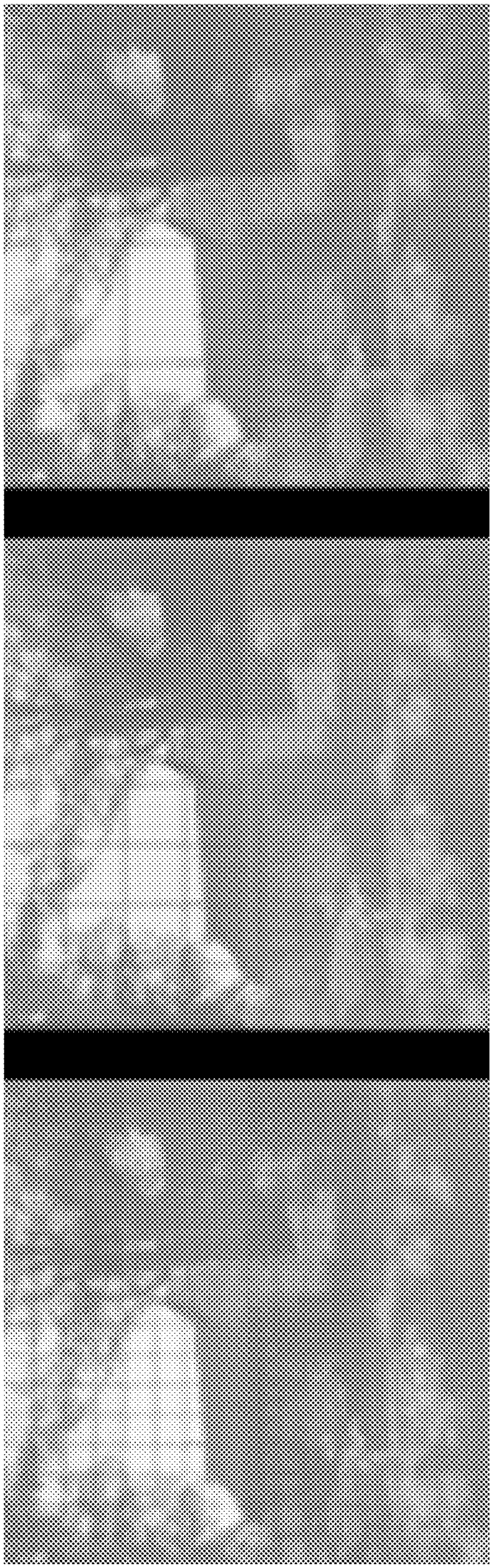
FIG. 1 shows the attention windows of a Swin transformer at different resolutions. Each grid cell represents a token, while 4×4 cell regions correspond to the attention windows. The number of attention windows is reduced as cell grids are linearly combined during pooling. The size of attention windows remains constant.

Swin Transformers are a type of neural topology based on transformer networks. Contrary to conventional transformers and their Computer Vision counterpart, Vision Transformers (ViT), Swin employs a hierarchical partitioning of the image in order to define local regions upon which the attention mechanism is applied. The image resolution is successively halved after a specific number of transformer blocks, which increases reach of the attention mechanism without actually increasing the size of the individual attention matrices. The main problem with such an approach is that long range dependencies are taken into consideration in an indirect fashion. It is only thanks to its window shifting mechanism that, through the use of multiple Swin Transformer blocks, information can slowly diffuse to distant regions of the image.

In this work we propose a reformulation of the method, exposing it as a sequential computation over an quadtree representation of the input images. We then propose a new flavor of Swin transformers that naturally emerges from said reformulation, which we refer to as Swin on Axes (Swinax). Compared to the first, Swinax can jointly consider token relationships at multiple scales, the dilation factor of the attentional mechanism increasing along with said scale. It can thus achieve the same degree of sparsity and computation of long range dependencies Swin achieves over multiple layers, but it does so in a single transformer block, with the computations being performed in parallel.

Transformers were first introduced in 2017 as an attentional mechanism that allows for the passing of information between a collection of tokens $X=\{x^{(1)}; \ldots ; x^{(k)}\}$ in language models. The attentional mechanism in question extracts a series of keys $K_X=[f_K(x^{(1)}); \ldots ; f_K(x^{(k)})]$, queries $Q_X=[f_Q(x^{(1)}); \ldots ; f_Q(x^{(k)})]$ and values $V_X=[f_V(x^{(1)}); \ldots ; f_V(x^{(k)})]$, then proceeding to apply the attentional mechanism shown below for a given attention head j:

$$Att^{(j)}(X) = Smx\left(\frac{1}{\sqrt{d_K}} K_X^{(j)} Q_X^{(j)^T} + B^{(j)}\right) V_X^{(j)} \quad (1)$$

Here, $d_K$ is the dimensionality of keys $$K_X^{(j)},$$

with Smx(·) corresponding to the softmax activation function. A given attentional layer has m attention heads, with the final output of the layer being a linear combination of the latter:

$$Y = \left[Att^{(1)}(\cdot), \ldots , Att^{(m)}(\cdot)\right] W_O \quad (2)$$

Apart from the attentional mechanism, a transformer block is typically followed by a two-layer fully connected network updating the token representations, with layer normalization after both the multi-head attention and fully connected sub-network. The original work proposed an encoder-decoder architecture, where a series of transformer blocks are stacked to produce an encoder processing an in-put token sequence, and similar set of such layers produces a decoder. Contrary to the encoder, the decoder consists of two attention mechanisms: the first one is the regular self-attention block, where the attentional mechanism looks at other tokens within the same sequence. The second one updates the token representations of the decoder based on those of the encoder in what is commonly known as cross-attention.

Latter variations introduced encoder-only and decoder-only models. The former model either the relationship between elements in a sequence by reconstructing masked input tokens, or directly predict a target la-bel based on the input sequence. The latter, on the other hand, are trained in an auto-regressive fashion by masking the self-attention mechanism, ensuring that each token will have access only to itself and the previous tokens.

The first significant success when applying transformer models to computer vision were Vision Transformers (ViT). Here, the author proposed an encoder-only topology where an input image is broken down into non-overlapping cells, typically using a 16×16 grid. Each of the cells is linearly projected into a feature vector representing a token, with an additional classification token added to the sequence. This token sequence is then fed to the encoder-only transformer, with the final output of the classification token being used as overall model output.

While this type of model proposes a robust tokenization approach, it still runs into the problem of a high memory usage in the order of $O(n^4)$, where n=16 is the cell grid resolution, and the corresponding high computational cost required to generate the attention matrix. While this would still correspond to a relatively small attentional matrix when compared to some language models, a large batch size is usually required in order to stabilize the training of computer vision models. A common way to solve this problem is to apply restrictions on the considered tokens when computing the attentional mechanism.

Local attention enforces locality during the computation of the attentional mechanism, with Swin transformers being the most well known example. In Swin, the grid of tokens is partitioned into non-overlapping W×W windows, where typically W=7. The attentional mechanism is applied to each window, with the window being displaced by 50% of its width at alternating layers. This allows the model to limit the size of the attentional matrices while still allowing the tokens falling near the edges to diffuse throughout the image. This reduces the memory usage from $O(n^4)$ to $O(n^2W^2)$. Swin also introduces a linear down-sampling function where, after a set of d transformer blocks, neighboring tokens in a non-overlapping grid of 2×2 cells are linearly combined together. This further reduces the memory and computational costs by lowering the number of tokens fed to subsequent transformer blocks, while also indirectly increasing the receptive field of the attention mechanism.

Neighborhood Attention (NA) considers a local token neighborhood for each of the target tokens during attention computation, resulting in a model equivalent to the marking of all elements outside the first k diagonals in the attention matrix. In order to efficiently implement it, the authors provide low level kernels to perform the attention computation, bypassing the otherwise prohibitive memory and computational cost restrictions that would result from implementing is as a series of linear algebra operators. The advantage of this approach is its intrinsic ability to diffuse information across the whole image, due to its lack of hard region boundaries between image segments. Similarly to Swin, a linear down-sampling step is introduced after every few attentional blocks.

A more recent work proposes Dilated Neighborhood Attention (DiNA), introducing dilation to NA. Similar to the approach it is based on, this is achieved through a low level CUDA kernel implementation. The dilation factor then becomes a per layer model hyper-parameter.

Sparse attention aims to combine sparse global attention patterns with denser local ones by introducing strategies that reduce the memory and computational costs. Sparse Transformers was the first work to introduce such an approach. The authors noted that ViT first learned locality patterns, factorizing across the vertical and horizontal axes on latter layers. Based on that, they implemented hand crafted factorizations of the attentional mechanism, weaving these insights into the architecture.

Longformers use a combination of sliding window attention, optionally with dilation, and global attention. They do so by considering a select subset of tokens as globally connected, serving as shortcuts for the diffusion of information across the token sequence. Routing Transformers use a learned attention connectivity instead. To do so, a series of k centroids are learned and used during k-means clustering to group the queries and keys of the attention mechanism. This restricts the attention matrix to mappings between queries and keys belonging to the same cluster. Note that nothing prevents a given token from having its query and key belong to different clusters, potentially giving the attention matrix a single component graph connectivity.

MaxViT, an approach based on Swin transformers, proposes decomposing an input $X \in R^{H\times W\times C>}$ into a batched form $$X \in R^{\frac{H}{N}\times\frac{W}{N}\times N\times N\times C>}.$$

In this form, applying an attention mechanism over axes N×N corresponds to the local windowed attention commonly seen in Swin. Applying it over axes $$\frac{H}{N}\times\frac{W}{N}$$

instead corresponds to a dilated attention over the whole picture, where the dilation factor is N. By applying two successive attention blocks, one over the local windows and the other dilated over the whole input, the approach considers both dense local and sparse global attention.

Our work falls on the latter category, proposing an attentional mechanism, also known as an attention mechanism, where the attention pattern gradually sparsifies the further away a region is from the target token. It shares some similarities with MaxViT, but using a more general, principled approach that lends it a higher degree of flexibility.

Method

The proposed approach is a reformulation of Swin transformers where the segmentation of the input into local attentional regions and linear pooling of tokens is seen as regular transformer and dimensionality reduction operations applied to a quadtree representation of the input image. As we show in this section, this allows for an equivalent more straightforward application of the approach, as well as allowing for other attentional operations such as attention dilation (sec.3.3) and multi-scale attention.

3.1. Hierarchical Structure of Swin

Swin defines a window of constant size W×W which is applied over the input token grid in a tiled, non-overlapping fashion, as shown in FIG. 1. This window is used to decide which cells of the grid will interact with each other during the computation of the attention mechanism, creating a local connectivity pattern within a given transformer block.

After successively applying a series of such layers, the resolution of the grid is reduced to half its original size by linearly projecting the features in each 2×2 non-overlapping neighborhood into a single output feature vector. This reduces the overall number of cells by 75%. Further transformer blocks are applied after that. While these maintain the same window size and thus the number of cells considered and size of the attention matrix, the receptive field effectively doubles in size due to the down-scaling of the grid.

3.2. Quadtree Representation

An intuitive way of representing the data input to a Swin transformer block is to define $X \in R^{B\times N_W\times W\times W\times F>}$, where B is the batch size, $N_W$ is the number of non-overlapping attention neighborhoods, W×W represents the spatial resolution of said neighborhoods and F corresponds to the feature length of a token. During pooling, we would need to transpose and reshape the matrix to $R^{B\times N_W/4\times W\times W\times 4F>}$ before applying the linear transform to each token.

Here we propose a different approach where the input data is directly structured into a quadtree, a hierarchical structure that is perfectly suited for this task. To do so, we may first expand the height and width dimensions of the input images into a series of size 2 axes, then reshuffle and reshape:

$$\begin{aligned} \mathbb{R}^{\langle B\times H\times W\times F\rangle} &\xrightarrow{reshap.} \mathbb{R}^{\langle B\times h_1\times\ldots\times h_n\times w_1\times\ldots\times w_n\times F>} \\ &\xrightarrow{transp.} \mathbb{R}^{\langle B\times h_1\times w_1\times\ldots\times h_n\times w_n\times F>} \\ &\xrightarrow{reshap.} \mathbb{R}^{\langle B\times a_1\times\ldots\times a_n\times F>} \end{aligned} \tag{3}$$

For 2d images, this results in a series of axes $\{a_1, \ldots, a_n\}$ of size 4. Please note that the above transform can just as easily be applied to three-dimensional data, such as video, or volumes. There, each dimension $a_i$ would be of size 8. Under this representation, axis $a_i$ partitions an input 2d image into four equally sized chunks corresponding to the four quadrants of a quadtree, while the successive dimensions each partition the previous quadrants into four more segments. This is illustrated by the leftmost image in FIG. 2. Under this representation, the attention computation and linear downsampling performed by Swin become much more straightforward. Below, an example is shown for a cell grid of size 64 (d=6 total axes), where the attention window is of size W=8 (w=3 axes).

$$X = R^{B\times a_1\times a_2\times a_3\times a_4\times a_5\times a_6\times F>} \tag{4}$$

Here, the last three spatial dimensions, also referred to as spatial axes, ($a_4$, $a_5$, $a_6$) correspond to the attention window, while the last dimension (F) are the features. The other dimensions correspond to the batch size. After applying k transformer blocks on the data, Swin performs a linear transform on non-overlapping neighbourhoods of size 2×2, resulting in a reduction of the image size. In our representation, this corresponds to shifting the selected axes for the attention window to the left such that the attention window corresponds to dimensions ($a_3$, $a_4$, $a_5$) and the last two dimensions ($a_6$,/\F) can then be linearly transformed and replaced by a single output feature dimension.

$$X = R^{B\times a_1\times a_2\times a_3\times a_4\times a_5\times a_6\times F>} \tag{5}$$

3.3. Dilated Attention

A direct extension to Swin comes from considering what would happen were we to shift the selection of attention window axes without subsuming the rightmost axis into the feature representation. That is, if we consider the following assignment of axes:

$$X + R^{B\times a_1\times a_2\times a_3\times a_4\times a_5\times a_6\times F>} \tag{6}$$

where B and axes ($a_1$, $a_2$, $a_6$) jointly define the batch size, while axes ($a_3$, $a_4$, $a_5$) define the attention window. Applying a transformer block over the above representation is equivalent to doubling the size of the attention window while maintaining the number of tokens, which is achieved through an implicit 2× dilation of the attention regions. This is illustrated by the rightmost image in FIG. 2. Displacing the selection of window axes further to the left would equate to a 4× dilation of the attention mechanism.

With this approach, we can compute larger attention regions without having to sub-sample the image nor increase the computational and memory costs. This allows us to consider both local and global attention before sub-sampling the grid cells, increasing the flexibility of Swin. The shifting of the attention windows, as performed on Swin at alternate attention blocks, also becomes unnecessary. This is due to subsequent dilated layers already allowing communication across attentional window boundaries by increasing the receptive field.

3.4. Multi-Scale Attention

Figure 3C:
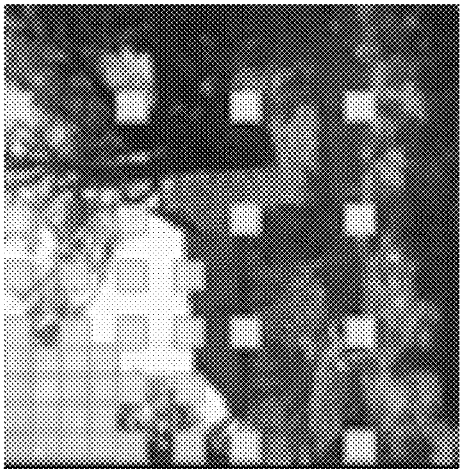
FIG. 3*c* shows the attentional neighbourhood of a given token, located at top left, with multi-axis attention applied over the axes of the quadtree representation using a sliding window of size 2.
Figure 3B:
FIG. 3*b* shows the attentional neighbourhood of a given token, located at top left, with multi-axis attention applied over each axis of the quadtree representation.
Figure 3A:
FIG. 3*a* shows the attentional neighbourhood of a given token, located at top left, with simple attention with an ×2 dilation factor.

We can further exploit the quadtree representation by applying the attention mechanism to multiple axes simultaneously. The simplest approach is to consider each axis independently, resulting in d attention matrices of size 4×4. This results in an attention mechanism where, for any given token, information is shared more densely among tokens that are closer in the quadtree representation, with the dilation factor increasing for tokens that are further away. This is shown in the middle diagram of FIG. 3 (FIG. 3*b*). A more general option is to apply the same approach over a sliding window moving across the axes, resulting in larger individual attention matrices. The former approach would then correspond to using a sliding window of size 1. For a sliding window of size 2, we would use each element of the set A={($a_1$, $a_2$), ($a_2$, $a_3$), . . . , ($a_{n-1}$, $a_n$),} as the attention window. This is illustrated on the rightmost diagram of FIG. 3 (FIG. 3*c*).

The keys $$K_X^{(j)},$$

queries $$Q_X^{(j)}$$

and values $$V_X^{(j)}$$

are computed once for all tokens and shared among the different attention windows, while a different set of attention biases $B^{(j,k)}$ is learned for each. The final value for any given attention head is obtained by multiplying the attention tensors $\tilde{A}^{(j,k)}$ with the values tensor $$V_X^{(j)},$$

then adding the resulting matrices together.

This corresponds to independently applying the same attentional mechanism over multiple dilation factors, instead of a single one computed over multiple scales. This can be solved by jointly computing the Softmax activation over the different attention tensors:

$$\overline{A}^{(j,k)} = \frac{e^{\hat{A}^{(j,k)}}}{Z^{(j)}} \tag{7}$$

$$Z_{abcd}^{(j)} = 1_{abcd} \otimes \left( \sum_{i=1}^{d-w+1} e^{\hat{A}^{(j,i)}} \right)_{abcduv}$$

where d is the dimensionality of the quadtree representation, w is the number of axes within the attention window, and $\hat{A}^{(j,k)}$ are the attention matrices before applying Softmax. The resulting algorithm for the computation of a multi-scale attention head j is shown in Alg. 1, where ⊗ denotes the Einstein summation operator.

Algorithm 1 Multi-scale attention mechanism

Require: $K_X^{(j)}, Q_X^{(j)}, V_X^{(j)}$

Require: $A = \{(a_1, a_2), .., (a_{n-1}, a_n)\}$
  for k, (u, v) ∈ enum(A) do
    $\hat{A}^{(j,k)}_{..uv..\hat{u}\hat{v}} \leftarrow (K_X^{(j)})_{..uv..z} \otimes (Q_X^{(j)})_{..\hat{u}\hat{v}..z}$
    $\hat{A}^{(j,k)} \longleftarrow \frac{1}{\sqrt{d_K}} \hat{A}^{(j,k)} + B^{(j,k)}$
  end for
  $[Z^{(j,1)}, \ldots Z^{(j,k)}] \leftarrow Smx\left(\left[\hat{A}^{(j,1)}, .., \hat{A}^{(j,k)}\right]\right)$
  $Att^{(j)} \leftarrow 0$
  for (u, v) ∈ A do
    $T_{..uv..z} \leftarrow Att^{(j)} + A^{(j,k)}_{..uv..\hat{u}\hat{v}} \otimes (V_X^{(j)})_{..\hat{u}\hat{v}..z}$
    $Att^{(j)} \leftarrow Att^{(j)} + T$
end for As for the computational complexity, the attentional mechanism is slightly more costly when compared to Swin. Given p the number of tokens, typically $p=2^{2d}$ given that in our approach the image size is ideally, but not limited to being, a power of 2 in both height and width, the number of axes of the quadtree representation equals $d=\log_2(\sqrt{p})$. This results in the following complexities:

$$\Omega(MSA) = 4pC^2 + 2p^2C \tag{8}$$

$$\Omega(W_{MSA}) = 4pC^2 + 2W^2pC$$

$$\Omega(MS_{MSA}) = 4pC^2 + 2W^2\log_2(\sqrt{p})pC$$

Whereas MSA incurs a quadratic cost relative to the input size, with the Windowed MSA being linear, Multi-Scale MSA has a slightly above linear cost that scales as $p \log_2(\sqrt{p})$ relative to the number of tokens p. From FIG. 3 (FIGS. 3*a*, 3*b* and 3*c*) we can see that some tokens are considered multiple times across dilation factors. More specifically, in the case of two-dimensional input data, each subsequent attentional window has an overlap of 25% with the previous ones. The overall redundancy of the attentional mechanism is described by the following equation:

$$\text{Red}(D, d) = 1 - \frac{1}{d}\left(1 + \sum_{i=2}^{d} \frac{2^D - 1}{2^D}\right) \tag{9}$$

Where d is the number of axes of the quadtree representation and D is the input data dimensionality (D=2 for images, D=3 for volumes such as video frames). As the input size increases, that is, as $d \rightarrow \infty$, the above formula can be simplified to the following form:

$$\text{Red}(D) = \lim_{d \to \infty} 1 - \frac{1}{d}\left(1 + \sum_{i=2}^{d} \frac{2^D - 1}{2^D}\right) \tag{10}$$

$$1 - \frac{2^D - 1}{2^D} = \frac{1}{2^D}$$

This results in an overall redundancy of Red(2)=25% for 2d images, and Red(3)=12.5% in the 3d case given sufficiently large inputs. This overhead would further decrease as the dimensionality of the input data increases.

4. Experiments

4.1. Topology

In order to evaluate our approach, we compare it against the standard Swin-T architecture used in the original paper, Alec Radford, Karthik Narasimhan, Tim Salimans, Ilya Sutskever, et al. "Improving language understanding by generative pre-training" 2018, the contents of which are incorporated herein by reference. We use an equivalent model with the same number of layers, feature size and linear down-scaling of the input images as in the original work, resulting in an equivalent number of trainable parameters. The only differences, applied to both the proposed approach and the baseline Swin-T model, are the following:

- We use pre-norm instead of post-norm, which has been shown to stabilize the training process of transformers. This allows us to skip the warm-up process during training.
- We use Swish activations instead of ReLU.
- For both Swin-T and the Swin-D model described below, we use an attention region of 8×8 tokens instead of the 7×7 one of the original work.

The reason for the latter change is the quadtree image representation. In order to apply the transform seen in Eq. 3, we can resize the input images to be of size $$X^{(i)} \in R^{2^n \times 2^n \times C>}.$$

The resizing can be done through bicubic interpolation of the pixel values or by cropping of the image. However, the present disclosure is not limited to images with the above size and so the resizing step is not essential. In particular, the input image spatial dimensions (H, W) can be factored such that $H=Q\times2^n$ and $W=R\times2^n$ with the factors of each spatial dimension being paired up in the quadtree representation.

We consider three different variations of our model. Swin-D Applies a dilation factor of ×1 (no dilation) and ×2 to alternating layers by following the approach described in Sec. 3.3.

Since this allows us to increase the receptive field without down-sampling the tokens, we drop the window shifting performed by the baseline Swin model. Swinax-S applies per-axis attention as described in Sec. 3.3 for a sliding window of size w=2, while Swinax-N uses uses the same window size as well as joint attention normalization. Attention window shifting is also dropped in both cases.

4.2. Results

We consider three classification tasks. The first is a 103-class variation of ImageNet obtained from the commonly used ImageNet1K. The classes have been merged according to the WordNet lexical database. In order to construct it, we iteratively aggregate all classes belonging to the superclass with the smallest number of total samples. This dataset is used to perform an ablation study comparing our baseline Swin-D with the other three proposals.

Figure 4:
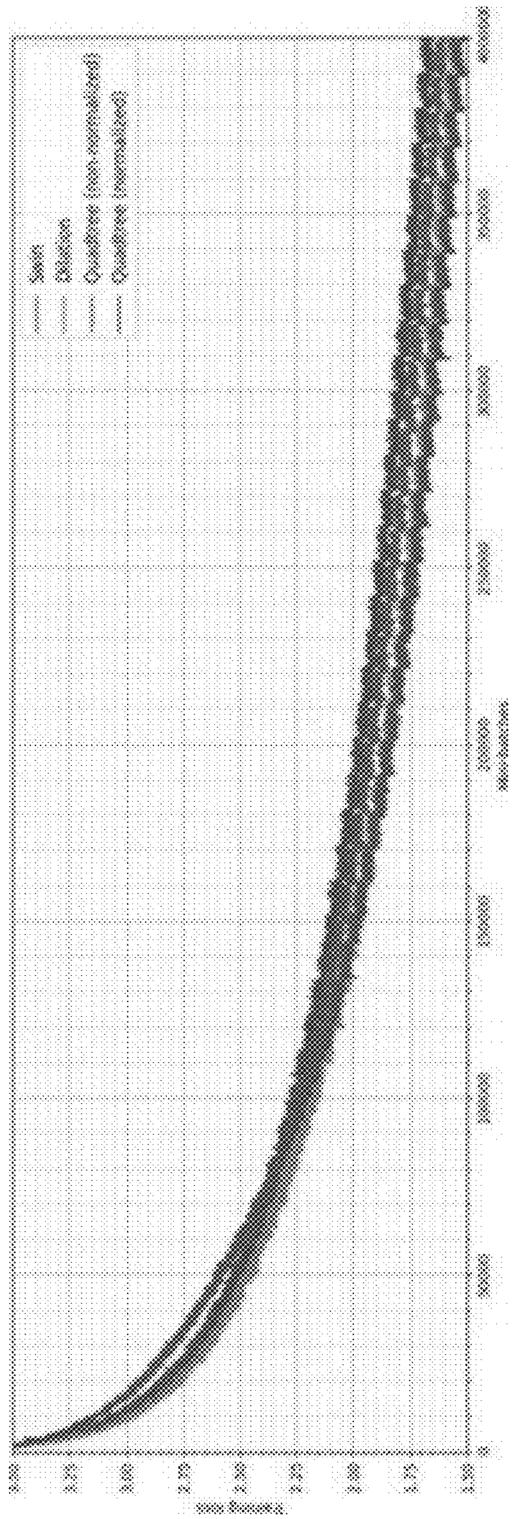
FIG. 4 shows a comparison between training losses of the baseline Swin model and the three approaches considered for ablation.

In FIG. 4 we see the training loss relative to the number of training iterations for both the Swin-T baseline and the three considered approaches. Dilating the receptive field on every other layer as done for Swin-D results on slightly faster convergence at no additional cost, the approach requiring the same amount of memory and computation as the baseline.

When we consider multi-scale attention, we see that just executing the attention mechanism on the collection A of axis subsets results on a drop in accuracy. On the other hand, if we perform a joint Softmax normalization instead of considering each scale independently, we obtain a slightly slower initial convergence rate, but eventually surpass all other considered approaches.

The other two datasets are ImageNet1K with the full 1000 classes, and Places365. For these two, we compare the baseline Swin-T model against Swinax-N, which we found to be the best performing model during the ablation study.

Figure 5:
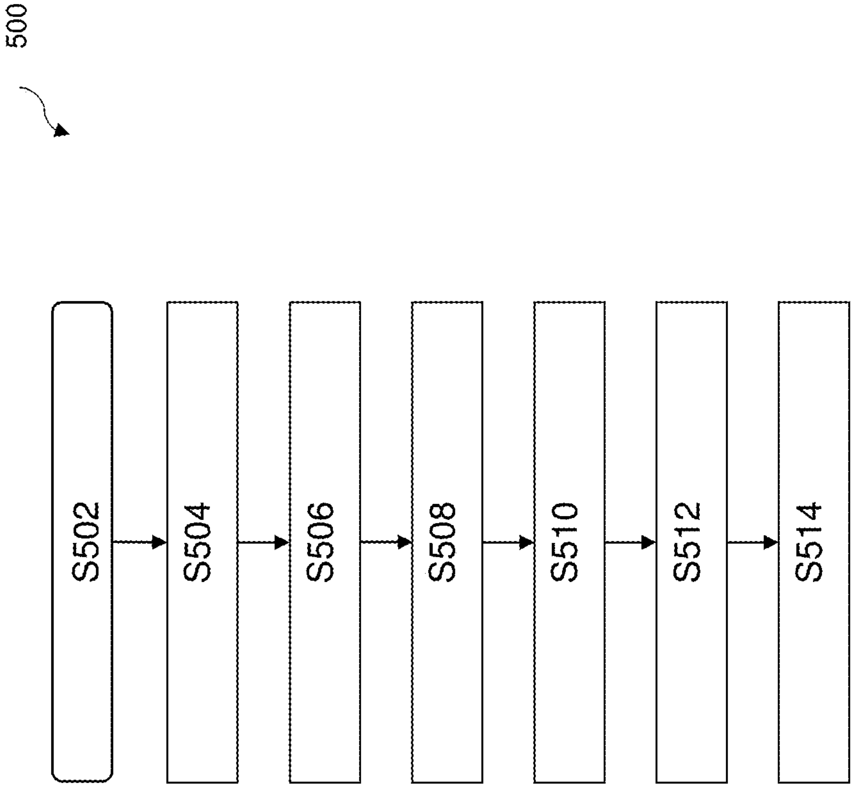
FIG. 5 shows a flowchart representing a method of obtaining an attention matrix for use in a transformer-based model, according to the present disclosure.

Referring to FIG. 5 a method, illustrated by a flowchart 500, which may be implemented in any of the preceding examples, comprises, in a step S502, inputting a d-dimensional piece of data, where d represents the number of dimensions of the data, $D_i$ represents the length of the i-th dimension for $i \in [1, \ldots, d]$ and $D_1 \times \ldots \times D_d$ corresponds to the size of the input data, in a step S504, factorizing each of the lengths of the input into the form $$D_i = \prod_{j=1}^{k} p_j^{n_j},$$

wherein $p_j$ is the j-th prime factor and $n_j$ is the number of repetitions of said factor, in a step S506, representing the input X of size $$\left(\prod_{i=1}^{k} p_j\right) \times \ldots \times \left(\prod_{i=1}^{k} p_j\right)$$

as:

$$X = \mathbb{R}^{((D_1)_1 \times \ldots \times (D_1)_m) \times \ldots \times ((D_d)_1 \times \ldots \times (D_d)_m) \times F>}$$

where $|(D_i)_j| = p_k$ for $j \in [1, \ldots, m]$ and $|F|$ corresponds to the feature length of the feature vector of each spatial location, in a step S508, reshuffling the representation of the input to represent the input as:

$$X = \mathbb{R}^{((D_1)_1 \times \ldots \times (D_d)_1) \times \ldots \times ((D_1)_m \times \ldots \times (D_d)_m) \times F>}$$

in a step S510, reshaping the representation of the input to form a first generation quadtree representation of the input as:

$$X = \mathbb{R}^{a_1 \times \ldots \times a_m \times F>}$$

wherein $|a_i| = |(D_1)_i| \times \ldots \times |(D_d)_i|$ for $i \in [1, \ldots, m]$, wherein the spatial axes are the axes of the quadtree representation excluding the feature vector F, wherein the m spatial axes are ordered by granularity such that the rightmost axis represents the finest granularity level of the quadtree representation of the input, in a step S512, selecting a first set of k consecutive spatial axes of the quadtree representation to form a first attention window, wherein $1 \leq k \leq m$, in a step S514, computing an attention matrix over the first attention window, with the remaining spatial axes of the quadtree representation being a batch size.

Figure 6:
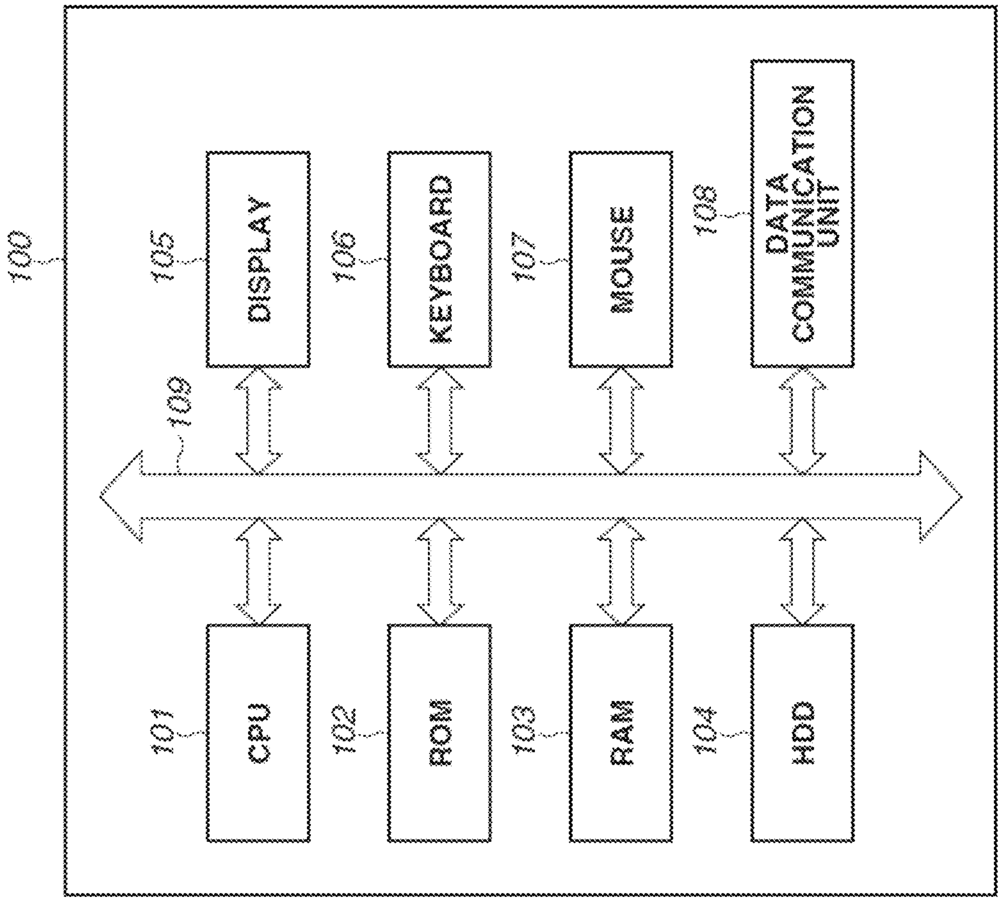
FIG. 6 shows a block diagram for describing an example hardware configuration of an apparatus 100 according to the present disclosure.

In FIG. 6, an apparatus according to the invention may include a central processing unit (CPU) or processor 101, a read-only memory (ROM) 102, a random access memory (RAM) 103, a hard disk drive (HDD) 104, a display 105, a keyboard 106, a mouse 107, and a data communication unit 108. These components of the apparatus 100 are connected to each other by a data bus 109. The CPU 101, the ROM 102, and the RAM 103 constitute a computer of the apparatus 100.

The CPU (processor) 101 is a system control unit and controls the entire apparatus 100. A program, stored in the HDD 104, may cause the apparatus 100 to execute a method of obtaining an attention matrix for use in a transformer-based model, according to any one of the above-mentioned examples.

Figure 2B:
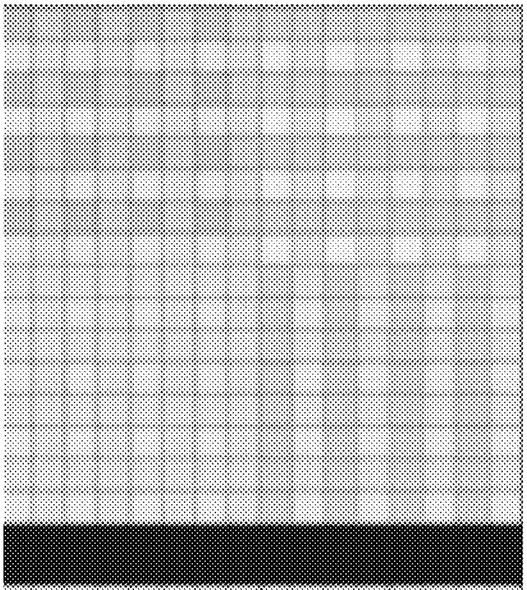
FIG. 2*b* shows the checkerboard pattern of the dilated attention windows, obtained by shifting the selected axes for the attention window to the left.
Figure 2A:
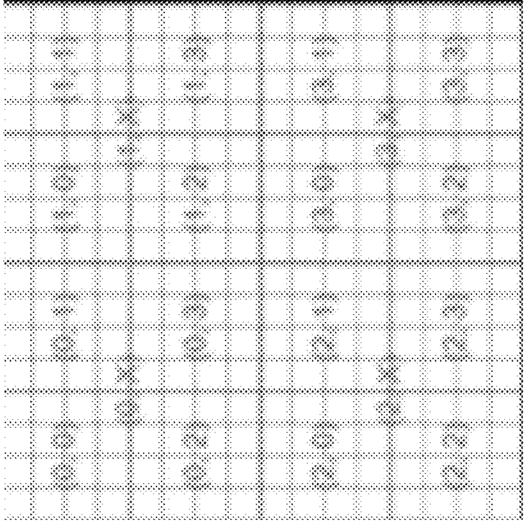
FIG. 2*a* shows coordinates of cells and subcells for the quadtree representation of the input cell grid.

In FIG. 2, the number of CPUs is one. However, this is not restrictive, and the apparatus 100 may include a plurality of CPUs.

The ROM 102 may store the said program and an operating system (OS) to be executed by the CPU 101. The RAM 103 provides memory for temporarily storing various types of information when the CPU 101 executes the program. The HDD 104 is a storage medium according to the present disclosure.

The display 105 (display unit) is a device for presenting a user interface (UI). The display 105 may include a touch sensor function. The keyboard 106 is one of input devices. For example, the keyboard 106 is used to input predetermined information to the UI displayed on the display 105. The mouse 107 is one of the input devices. For example, the mouse 107 is used to click on a button on the UI displayed on the display 105.

The data communication unit 108 (communication unit) is a device for communicating with external apparatuses.

The data bus 109 connects the foregoing units (102 to 108) with the CPU 101.

Some embodiments may be implemented as a recording medium including a computer-readable instruction such as a computer-executable program module. The computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium generally includes a computer-readable instruction, a data structure, a program module, other data of a modulated data signal, or another transmission mechanism, and an example thereof includes an arbitrary information transmission medium.

While the disclosure has been particularly shown and described with reference to embodiments thereof, it will be understood by one of ordinary skill in the art that various changes in form and details may be made therein without departing from the scope of the disclosure as defined by the following claims. Hence, it will be understood that the embodiments described above are not limiting of the scope of the disclosure.

Although the method has been described as a method for image classification, it is to be understood that the method may relate to part or all of a method for image classification, image segmentation, and pixel-based analysis, where the remaining part of the method, if any, corresponds to conventional techniques.

The scope of the disclosure is indicated by the claims rather than by the detailed description of the disclosure, and it should be understood that the claims and all modifications or modified forms drawn from the concept of the claims are included in the scope of the disclosure.

The invention claimed is:

1. A method of obtaining an attention matrix for use in a transformer-based machine learning model, the method comprising:

inputting a d-dimensional piece of data, where d represents the number of dimensions of the data, $D_i$ represents the length of the i-th dimension for $i \in [1, \dots, d]$ and $D_1 \times \dots \times D_d$ corresponds to the size of the input data, factorizing each of the lengths of the input into the form $$D_i = \prod_{j=1}^{k} p_j^{n_j},$$

wherein $p_j$ is the j-th prime factor and $n_j$ is the number of repetitions of said factor, representing the input X of size $$\left(\prod_{i=1}^{k} p_j\right) \times \dots \times \left(\prod_{i=1}^{k} p_j\right)$$

as:

$$X = \mathbb{R}^{((D_1)_1 \times \dots \times (D_1)_m) \times \dots \times ((D_d)_1 \times \dots \times (D_d)_m) \times F>}$$

where $|(D_i)_j| = p_k$ for $j \in [1, \dots, m]$ and $|F|$ corresponds to the feature length of the feature vector of each spatial location, reshuffling the representation of the input to represent the input as:

$$X = \mathbb{R}^{((D_1)_1 \times \dots \times (D_d)_1) \times \dots \times ((D_1)_m \times \dots \times (D_d)_m) \times F>}$$

reshaping the representation of the input to form a first generation quadtree representation of the input as:

$$X = \mathbb{R}^{a_1 \times \dots \times a_m \times F>}$$

wherein $|a_i| = |(D_1)_i| \times \dots \times |(D_d)_i|$ for $i \in [1, \dots, m]$, wherein the spatial axes are the axes of the quadtree representation excluding the feature vector F, wherein the m spatial axes are ordered by granularity such that the rightmost axis represents the finest granularity level of the quadtree representation of the input, selecting a first set of k consecutive spatial axes of the quadtree representation to form a first attention window, wherein $1 \le k \le m$, computing an attention matrix over the first attention window, with the remaining spatial axes of the quadtree representation being a batch size, the attention matrix being applied to an image without requiring the image to be sub-sampled.

2. The method of claim 1, further comprising:

selecting any number of additional sets of k consecutive spatial axes on the quadtree representation to form additional attention windows different from the first attention window, applying an attentional mechanism at least once over the second attention window to form at least one second attention matrix, concatenating the first attention matrix with the at least one second attention matrix to form a concatenated attention matrix, normalising across rows of the concatenated attention matrix.

3. The method of claim 2, wherein the attentional mechanism is applied over all possible sets of k consecutive spatial axes, resulting in m−k+1 attention matrices.

4. The method of claim 2, further comprising:

linearly projecting the rightmost spatial axis of the quadtree representation with the feature vector F to obtain a second generation feature vector F' for a second generation quadtree representation, wherein the second generation quadtree representation has one less spatial axis than the first generation quadtree representation.

5. The method of claim 1, wherein the transformer-based model is for either image classification or regression given a two-dimensional input representing an image.

6. The method of claim 1, wherein the transformer-based model is for either video classification or regression given a three-dimensional input representing a video.

7. A non-transitory computer readable storage medium storing a program for causing a computer to execute a method of obtaining an attention matrix for use in a transformer-based machine learning model, the method comprising:

inputting a d-dimensional piece of data, where d represents the number of dimensions of the data, $D_i$ represents the length of the i-th dimension for $i \in [1, \dots, d]$ and $D_1 \times \dots \times D_d$ corresponds to the size of the input data, factorizing each of the lengths of the input into the form $$D_i = \prod_{j=1}^{k} p_j^{n_j},$$

wherein $p_j$ is the j-th prime factor and $n_j$ is the number of repetitions of said factor, representing the input X of size $$\left(\prod_{i=1}^{k} p_j\right) \times \dots \times \left(\prod_{i=1}^{k} p_j\right)$$

as:

$$X = \mathbb{R}^{((D_1)_1 \times \dots \times (D_1)_m) \times \dots \times ((D_d)_1 \times \dots \times (D_d)_m) \times F>}$$

where $|(D_i)_j| = p_k$ for $j \in [1, \dots, m]$ and $|F|$ corresponds to the feature length of the feature vector of each spatial location, reshuffling the representation of the input to represent the input as:

$$X = \mathbb{R}^{((D_1)_1 \times \dots \times (D_d)_1) \times \dots \times ((D_1)_m \times \dots \times (D_d)_m) \times F>}$$

reshaping the representation of the input to form a first generation quadtree representation of the input as:

$$X = \mathbb{R}^{a_1 \times \ldots \times a_m \times F>}$$

wherein $|a_i| = |(D_1)_i| \times \ldots \times |(D_d)_i|$ for $i \in [1, \ldots, m]$, wherein the spatial axes are the axes of the quadtree representation excluding the feature vector F, wherein the m spatial axes are ordered by granularity such that the rightmost axis represents the finest granularity level of the quadtree representation of the input, selecting a first set of k consecutive spatial axes of the quadtree representation to form a first attention window, wherein $1 \le k \le m$, computing an attention matrix over the first attention window, with the remaining spatial axes of the quadtree representation being a batch size, the attention matrix being applied to an image without requiring the image to be sub-sampled.

8. The non-transitory computer readable storage medium of claim 7, wherein the method further comprises:

selecting any number of additional sets of k consecutive spatial axes on the quadtree representation to form additional attention windows different from the first attention window, applying an attentional mechanism at least once over the second attention window to form at least one second attention matrix, concatenating the first attention matrix with the at least one second attention matrix to form a concatenated attention matrix, normalising across rows of the concatenated attention matrix.

9. The non-transitory computer readable storage medium of claim 8, wherein the attentional mechanism is applied over all possible sets of k consecutive spatial axes, resulting in $m-k+1$ attention matrices.

10. The non-transitory computer readable storage medium of claim 8, wherein the method further comprises:

linearly projecting the rightmost spatial axis of the quadtree representation with the feature vector F to obtain a second generation feature vector F' for a second generation quadtree representation, wherein the second generation quadtree representation has one less spatial axis than the first generation quadtree representation.

11. The non-transitory computer readable storage medium of claim 7, wherein the transformer-based model is for either image classification or regression given a two-dimensional input representing an image.

12. The non-transitory computer readable storage medium of claim 7, wherein the transformer-based model is for either video classification or regression given a three-dimensional input representing a video.

13. An apparatus for obtaining an attention matrix for use in a transformer-based machine learning model, the apparatus having at least one processor configured to:

input a d-dimensional piece of data, where d represents the number of dimensions of the data, $D_i$ represents the length of the i-th dimension for $i \in [1, \ldots, d]$ and $D_1 \times \ldots \times D_d$ corresponds to the size of the input data, factorize each of the lengths of the input into the form $$D_i = \prod_{j=1}^{k} p_j^{n_j},$$

wherein $p_j$ is the j-th prime factor and $n_j$ is the number of repetitions of said factor, represent the input X of size $$\left(\prod_{i=1}^{k} p_j\right) \times \ldots \times \left(\prod_{i=1}^{k} p_j\right)$$

as:

$$X = \mathbb{R}^{((D_1)_1 \times \ldots \times (D_1)_m) \times \ldots \times ((D_d)_1 \times \ldots \times (D_d)_m) \times F>}$$

where $|(D_i)_j| = p_k$ for $j \in [1, \ldots, m]$ and $|F|$ corresponds to the feature length of the feature vector of each spatial location, reshuffle the representation of the input to represent the input as:

$$X = \mathbb{R}^{((D_1)_1 \times \ldots \times (D_d)_1) \times \ldots \times ((D_1)_m \times \ldots \times (D_d)_m) \times F>}$$

reshape the representation of the input to form a first generation quadtree representation of the input as:

$$X = \mathbb{R}^{a_1 \times \ldots \times a_m \times F>}$$

wherein $|a_i| = |(D_1)_i| \times \ldots \times |(D_d)_i|$ for $i \in [1, \ldots, m]$, wherein the spatial axes are the axes of the quadtree representation excluding the feature vector F, wherein the m spatial axes are ordered by granularity such that the rightmost axis represents the finest granularity level of the quadtree representation of the input, select a first set of k consecutive spatial axes of the quadtree representation to form a first attention window, wherein $1 \le k \le m$, compute an attention matrix over the first attention window, with the remaining spatial axes of the quadtree representation being a batch size, the attention matrix being applied to an image without requiring the image to be sub-sampled.

14. The apparatus of claim 13, wherein the at least one processor is configured to:

select any number of additional sets of k consecutive spatial axes on the quadtree representation to form additional attention windows different from the first attention window, apply an attentional mechanism at least once over the second attention window to form at least one second attention matrix, concatenate the first attention matrix with the at least one second attention matrix to form a concatenated attention matrix, normalise across rows of the concatenated attention matrix.

15. The apparatus of claim 14, wherein the at least one processor is configured to apply the attentional mechanism over all possible sets of k consecutive spatial axes, resulting in $m-k+1$ attention matrices.

16. The apparatus of claim 14, the at least one processor being configured to:

linearly project the rightmost spatial axis of the quadtree representation with the feature vector F to obtain a second generation feature vector F' for a second generation quadtree representation, wherein the second generation quadtree representation has one less spatial axis than the first generation quadtree representation.

17. The apparatus of claim 13, wherein the transformer-based model is for either image classification or regression given a two-dimensional input representing an image.

18. The apparatus of claim 13, wherein the transformer-based model is for either video classification or regression given a three-dimensional input representing a video.

* * * * *